(12) United States Patent
Forster et al.

(10) Patent No.: US 7,298,343 B2
(45) Date of Patent: Nov. 20, 2007

(54) RFID TAG WITH ENHANCED READABILITY

(75) Inventors: Ian J. Forster, Chelmsford (GB); David J. Puleston, Duluth, GA (US)

(73) Assignee: Avery Dennison Corporation, Pasadena, CA (US)

( * ) Notice: Subject to any disclaimer, the term of this patent is extended or adjusted under 35 U.S.C. 154(b) by 19 days.

(21) Appl. No.: 10/981,321

(22) Filed: Nov. 4, 2004

(65) Prior Publication Data
US 2005/0093677 A1 May 5, 2005

Related U.S. Application Data

(60) Provisional application No. 60/517,155, filed on Nov. 4, 2003.

(51) Int. Cl.
*H01Q 13/10* (2006.01)
(52) U.S. Cl. ............... 343/767; 343/795; 343/700 MS
(58) Field of Classification Search ............... 343/795, 343/797, 767, 700 MS, 741, 866, 867, 803, 343/895
See application file for complete search history.

(56) References Cited

U.S. PATENT DOCUMENTS

| | | | |
|---|---|---|---|
| 5,751,256 A | 5/1998 | McDonough et al. | |
| 6,049,278 A | 4/2000 | Guthrie et al. | |
| 6,050,622 A | 4/2000 | Gustafson et al. | |
| 6,097,347 A | 8/2000 | Duan et al. | |
| 6,259,408 B1 | 7/2001 | Brady et al. | |
| 6,278,413 B1 | 8/2001 | Hugh et al. | |
| 6,335,686 B1 * | 1/2002 | Goff et al. | 340/572.4 |
| 6,346,884 B1 | 2/2002 | Uozumi et al. | |
| 6,353,406 B1 * | 3/2002 | Lanzl et al. | 342/118 |
| 6,501,435 B1 * | 12/2002 | King et al. | 343/795 |
| 6,853,345 B2 | 2/2005 | King et al. | |
| 6,864,848 B2 * | 3/2005 | Sievenpiper | 343/767 |
| 6,956,538 B2 * | 10/2005 | Moore | 343/878 |
| 7,007,841 B2 * | 3/2006 | Kocott | 235/385 |
| 7,057,492 B2 * | 6/2006 | Jackson et al. | 340/5.61 |

(Continued)

FOREIGN PATENT DOCUMENTS

AU       199857681 B2    12/2000

(Continued)

OTHER PUBLICATIONS

Claims from U.S. Appl. No. 10/981,423, filed Nov. 4, 2004.

*Primary Examiner*—Hoanganh Le
(74) *Attorney, Agent, or Firm*—Renner, Otto, Boisselle & Sklar, LLP

(57) ABSTRACT

A radio frequency identification (RFID) device includes a conductive antenna structure having an elongated slot therein. Parts of the antenna structure on both sides of one end of the elongated slot are coupled to a wireless communication device, such as an RFID chip or interposer. On the opposite end of the elongated slot, parts of the antenna structure at both sides of the elongated slot are electrically coupled together, for instance by being coupled together by other conductive parts of the antenna structure. All of the parts of the antenna structure may be parts of a continuous unitary layer of conductive material. The antenna structure with the elongated slot therein may facilitate increased readability of the RFID device, particularly in directions out from the edges of the RFID device.

44 Claims, 13 Drawing Sheets

U.S. PATENT DOCUMENTS

| | | |
|---|---|---|
| 7,075,435 B2 | 7/2006 | Jesser |
| 2001/0054755 A1 | 12/2001 | Kirkham |
| 2002/0067267 A1 | 6/2002 | Kirkham |
| 2002/0167450 A1 | 11/2002 | Korden et al. |
| 2002/0175818 A1 | 11/2002 | King et al. |
| 2003/0112196 A1 | 6/2003 | Wang et al. |
| 2003/0179151 A1 | 9/2003 | Senba et al. |
| 2005/0012616 A1* | 1/2005 | Forster et al. ............ 340/572.7 |
| 2005/0093678 A1* | 5/2005 | Forster et al. ............. 340/10.1 |
| 2005/0280537 A1* | 12/2005 | Feltz et al. .............. 340/572.1 |
| 2006/0086809 A1 | 4/2006 | Shanks et al. |
| 2006/0103532 A1* | 5/2006 | Van Fleet ................ 340/572.1 |

FOREIGN PATENT DOCUMENTS

| | | |
|---|---|---|
| EP | 1 083 519 | 9/2000 |
| EP | 0 954 756 B1 | 10/2002 |
| EP | 1 327 958 A1 | 7/2003 |
| EP | 1 459 911 | 3/2004 |
| JP | 2004246816 | 9/2004 |
| WO | WO 00/21031 | 4/2000 |
| WO | WO 02/25583 A1 | 3/2002 |
| WO | 2004074016 | 2/2003 |
| WO | WO 2004/100366 | 11/2004 |

* cited by examiner

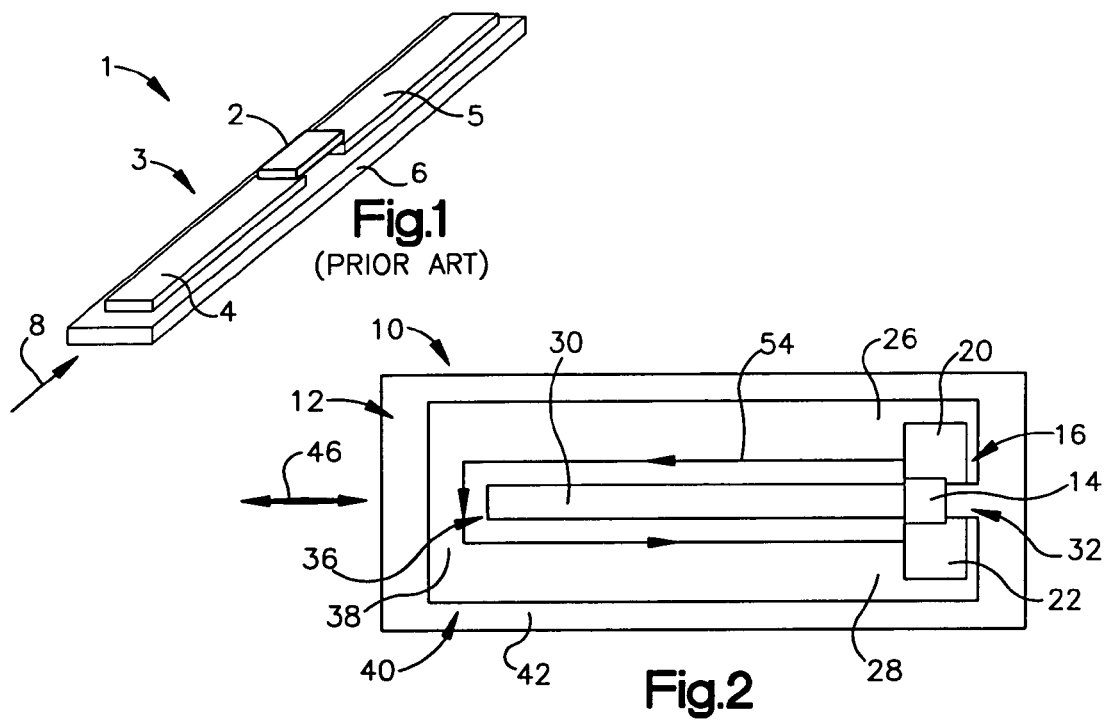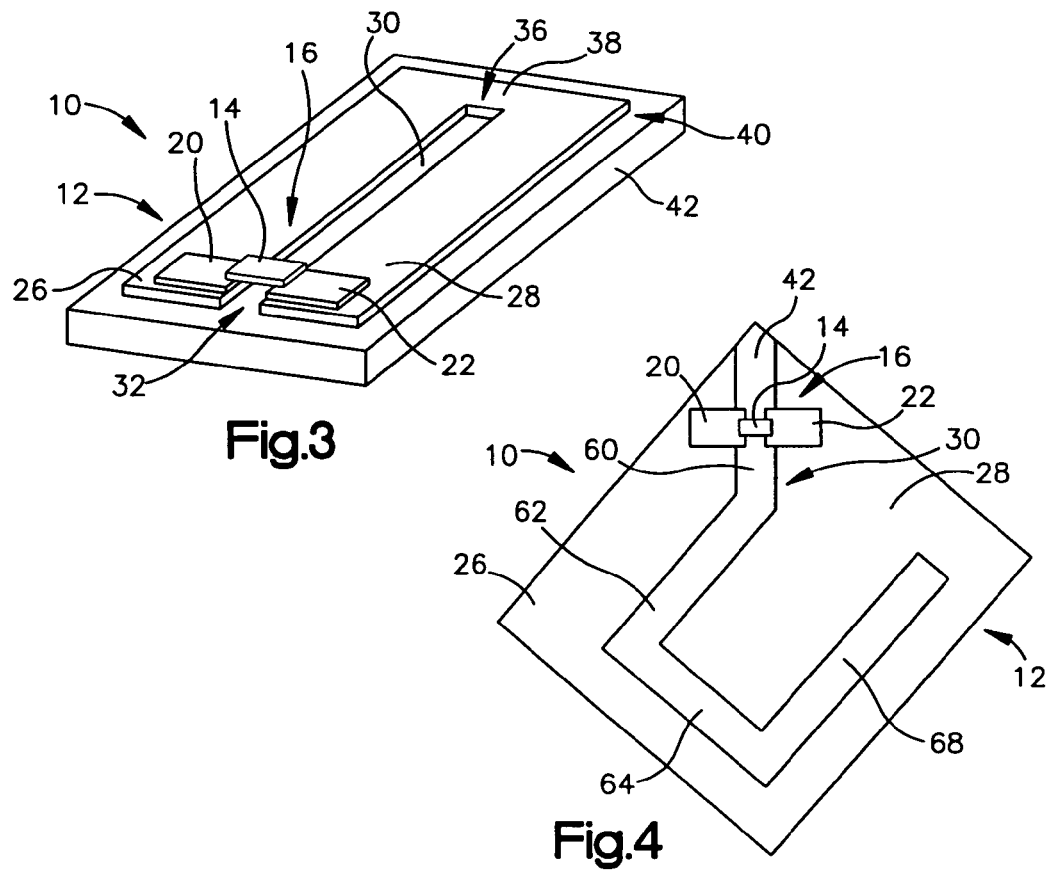

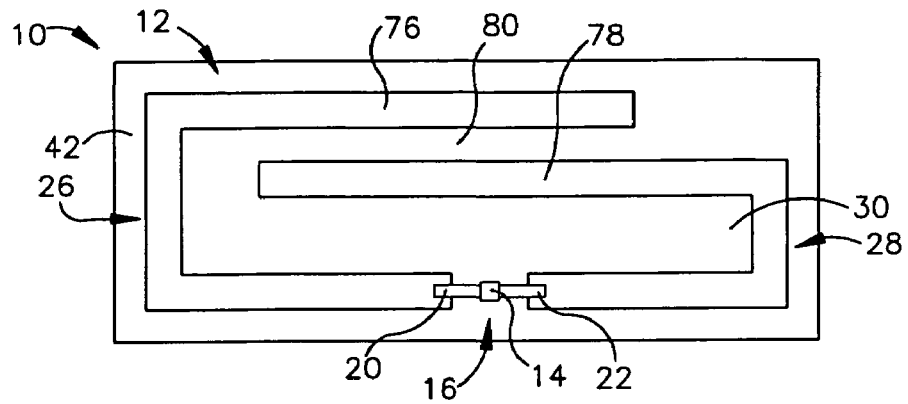
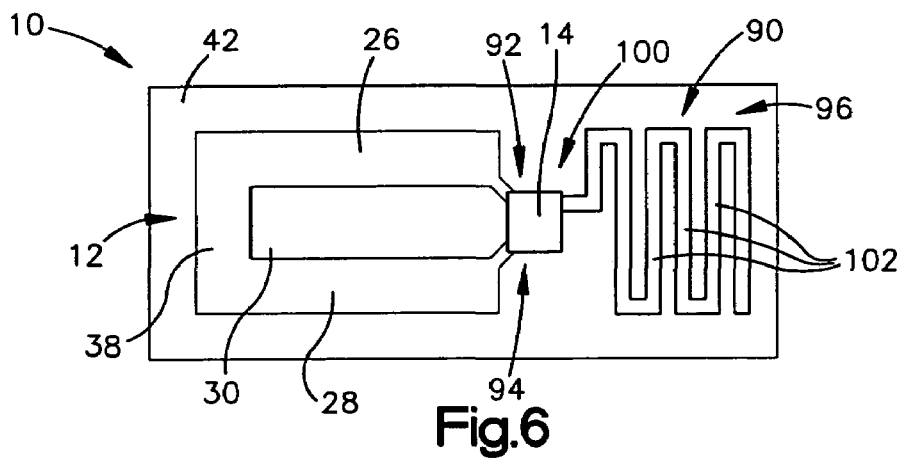
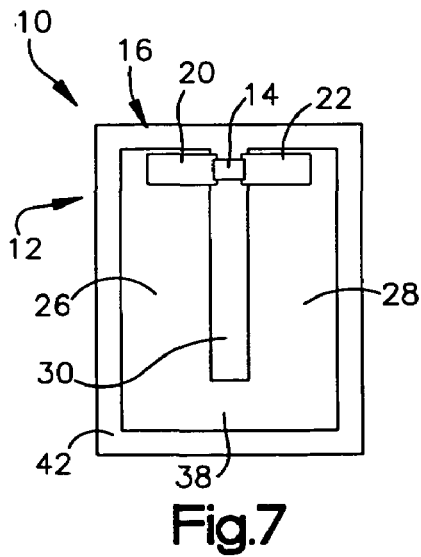
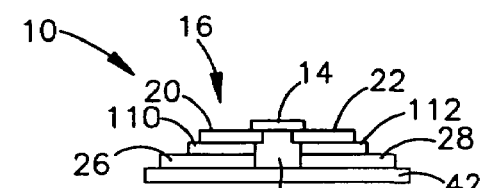
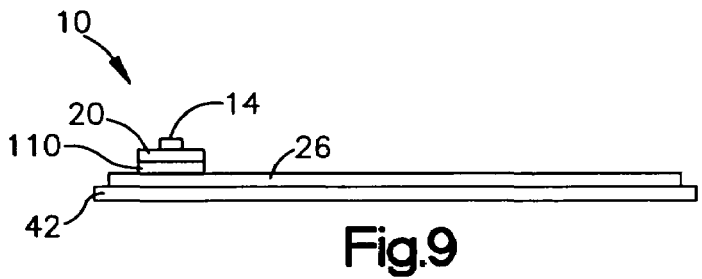

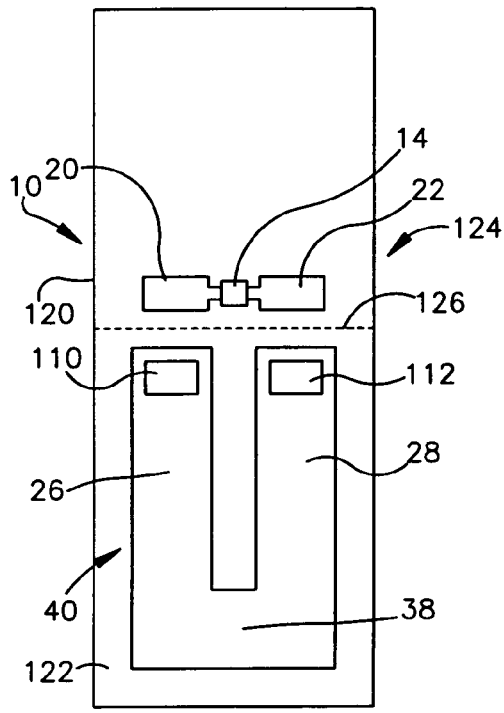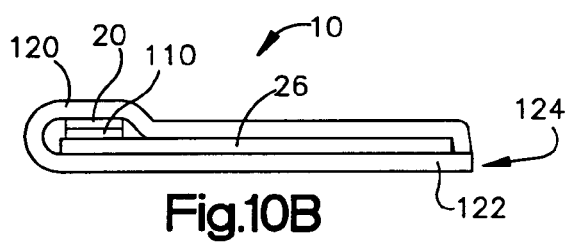
Fig.10A
Fig.10B
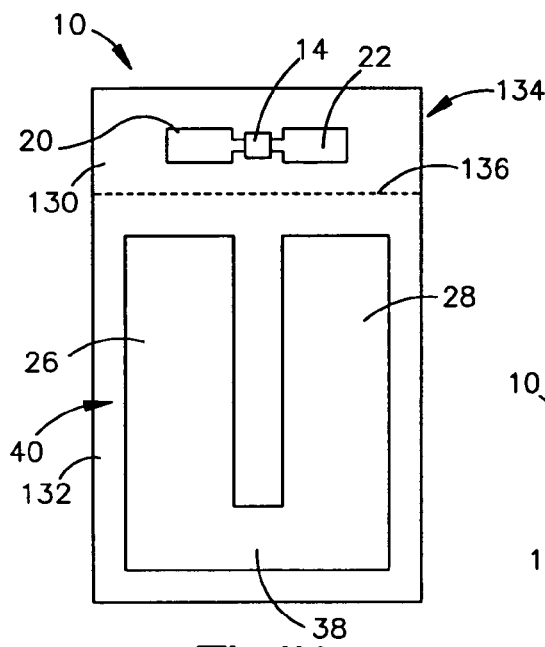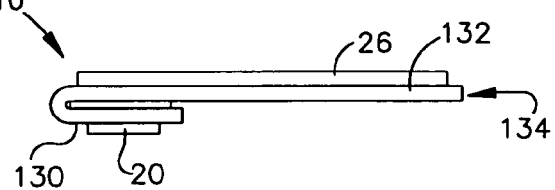
Fig.11A
Fig.11B

RFID TAG WITH ENHANCED READABILITY

CROSS-REFERENCE TO RELATED APPLICATIONS

Priority is claimed under 35 USC 119(e) to U.S. Provisional Application No. 60/517,155, filed Nov. 4, 2003, which is incorporated herein by reference in its entirety.

BACKGROUND OF THE INVENTION

1. Field of the Invention

This invention relates to the field of Radio Frequency Identification (RFID) tags and labels, and in particular to tags and labels that include an antenna structure.

2. Description of the Related Art

Current inventory and manufacturing methods rely on the ability to track and identify items of concern, such as inventory items, packages, individual parts, etc., and to communicate information concerning such items of concern in a wireless manner for processing and use. One known method of tracking and providing information on such items of concern is to attach to each such item a wireless communication device, such as an active or passive transponder, incorporated into an identification tag or label that responds to radio frequency interrogation and commands. The tag may store or represent information concerning the object to which it is attached, such as a unique identifying number, object status such as opened or unopened, location, and the like. The tag may be attached to an individual item or to packaging containing multiple items.

One example of a prior art RFID device 1 is illustrated in FIG. 1. The device 1 includes a chip 2 coupled to a simple dipole antenna structure 3. The antenna structure 3 consists of a pair of antenna elements 4 and 5 on a substrate 6.

One difficulty with the simple dipole antenna structure 3 illustrated in FIG. 1 is that the readability of the structure may be highly dependent on its orientation. For instance, readability of the device 1 along its edges, especially parallel to the direction of the antenna elements 4 and 5, along a narrow axis 8 of the device 1, may be difficult.

It will be appreciated that it would be desirable to have RFID devices that overcome the previously-mentioned difficulties.

SUMMARY OF THE INVENTION

According to an aspect of the invention, an RFID device includes a hybrid loop-slot antenna.

According to another aspect of the invention, an RFID device includes: an antenna structure having electrically conductive material on both sides of an elongated slot; a wireless communication device having a pair of contacts electrically coupled to respective parts of the conductive material. The parts of conductive material are electrically coupled together at an end of the elongated slot distal from the wireless communication device.

According to yet another aspect of the invention, an RFID device has a continuous layer of conductive material with an elongated slot therein; and an RFID interposer with respective different contact points electrically coupled to the conductive material on the two sides of the elongated slot.

According to still another aspect of the invention, a method of communicating with one or more of plural RFID devices, the method comprising: enhancing performance of the devices by bringing the devices in close proximity to one another; and communicating with wireless communication devices of the one or more of the devices.

According to a further aspect of the invention, performance of RFID devices is enhanced by the devices being brought in close proximity to one another.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily according to scale,

FIG. 1 is an oblique view of a prior art device having a simple dipole antenna structure;

FIG. 2 is a plan view of an RFID device in accordance with the present invention;

FIG. 3 is an oblique view of the RFID device of FIG. 2;

FIG. 4 is a plan view of an alternate embodiment RFID device in accordance with the present invention;

FIG. 5 is a plan view of another embodiment RFID device in accordance with the present invention;

FIG. 6 is a plan view of yet another alternate embodiment RFID device, utilizing a monopole antenna;

FIG. 7 is a plan view of still another alternate embodiment RFID device in accordance with the present invention;

FIG. 8 is an end view of the device of FIG. 7;

FIG. 9 is a side view of the device of FIG. 7;

FIG. 10A is a plan view of another alternate embodiment RFID device in accordance with the present invention;

FIG. 10B is a side view of the device of FIG. 10A, with the substrate of the device folded along a fold line;

FIG. 11A is a plan view of another alternate embodiment RFID device in accordance with the present invention;

FIG. 11B is a side view of the device of FIG. 11A, with the substrate of the device folded along a fold line;

DETAILED DESCRIPTION

Figure 12:
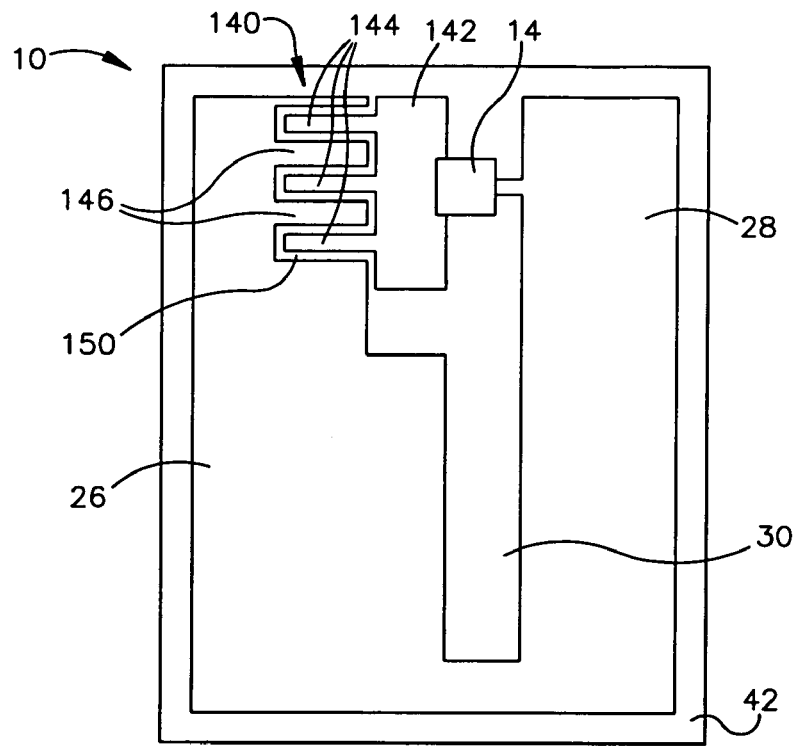
FIG. 12 is a plan view of yet another alternate embodiment RFID device in accordance with the present invention.

A radio frequency identification (RFID) device includes a conductive antenna structure having an elongated slot therein. Parts of the antenna structure on both sides of one end of the elongated slot are coupled to a wireless communication device, such as an RFID chip or interposer. On the opposite end of the elongated slot, parts of the antenna structure at both sides of the elongated slot are electrically coupled together, for instance by being coupled together by other conductive parts of the antenna structure. All of the parts of the antenna structure may be parts of a continuous unitary layer of conductive material. The antenna structure with the elongated slot therein may facilitate increased readability of the RFID device, particularly in directions out from the edges of the RFID device. The antenna structure may be directly conductively coupled to the wireless communication device. Alternatively, the antenna structure may be indirectly (reactively) coupled to the RFID device, such as by capacitive coupling.

Referring initially to FIGS. 2 and 3, an RFID device 10 includes an antenna structure 12 that is coupled to a wireless communication device, such as an RFID chip 14 that may be a part of an RFID interposer or strap 16. The RFID interposer or strap 16 includes conductive leads 20 and 22 that are coupled to arms or parts 26 and 28 of the antenna structure 12.

The standard elements of the interposer or strap 16 include the RFID chip 14 and conductive leads. The interposer or strap 16 also may include a substrate to support the RFID chip 14 and the conductive leads. In most embodiments herein (e.g. FIGS. 2 and 3) there is no substrate, but rather the conductive leads and the chip 14 are supported by the antenna. In the embodiments of FIGS. 10A and 11A (discussed below), the interposer substrate is the same as the antenna substrate. In another possible variation, the RFID chip and the conductive leads may be supported by a separate substrate for processing purposes, and this separate substrate may remain with the chip and leads after the chip and leads are coupled to the antenna, or may be removed.

The arms 26 and 28 are on either side of an aperture or elongated slot 30, an opening between the parts of the antenna structure 12. At a first end 32 of the aperture or elongated slot 30, an open end, the arms 26 and 28 are electrically coupled to the conductive leads 20 and 22 of the RFID interposer or strap 16. The conductive leads 20 and 22 are in turn coupled to contact points of the RFID chip 14. At a second end 36 of the aperture or slot 30, a closed end that is distal relative to the RFID interposer or strap 16, the arms 26 and 28 are electrically connected together, for example by linked together by a conductive connection 38 that is also part of the antenna structure 12. The arms 26 and 28, and the conductive connection 38, all may be parts of a unitary, continuous layer 40 of conductive material forming the antenna structure 12. The conductive layer 40 may be attached or otherwise coupled to a substrate 42.

The slot or aperture 30 may have a substantially constant width between the arms 26 and 28 of the antenna structure 12. The slot 30 may have a length from approximately one quarter of a wavelength of radiation used to communicate with the RFID chip 14. The slot 30 has a slot length in a direction in which the slot is elongated (along a narrow axis 46 from the first end 32 to the second end 36). and a slot width in a direction perpendicular to the slot length (between the arms 24 and 28). As shown in FIGS. 2 and 3, the parts of the arms 26 and 28 extending on the sides of the slot 20 along the slot length have a combined width in the direction of the slot width that is greater than the slot width of the slot 30. The slot 30 allows the RFID device 10 to be read along the a narrow axis 46. Indeed, the RFID device 10 may exhibit good readability characteristics in substantially any direction within or parallel to the plane of the antenna structure 12 or the RFID device 10 as a whole.

In addition, at short ranges, the RFID device 10 demonstrates good read performance in other directions, such as above and below the tag. Thus the RFID device 10 shows good read performance in all directions around the device 10. The read performance of the RFID device 10 is good even when the device 10 is of a small size. For example, an RFID device of the configuration shown in FIGS. 2 and 3, having outer dimensions of 25 mm×25 mm (1 inch×1 inch) has been found to have good read performance at distances in excess of 2 m (6.5 feet), when utilizing suitable power and frequency levels. Examples of suitable power and frequency labels are operation over a frequency band of 902 to 928 MHz at a power of 4 W e.i.r.p (effective isotropic radiated power) in accordance with FCC part 15 section 247. By using a suitable reader with either a circularized polarized antenna, or dual linear antennas polarized at 90 degrees to each other connected to separate ports on a reader system which are alternately switched, the antenna structure 12 gives a read capability that is good over a wide variety of orientations, and may be substantially orientation independent.

The coupling between the RFID chip 14 and the arms 26 and 28 may either be a direct conductive coupling, occurring through the conductive leads 20 and 22 of the interposer 16, or may be in whole or in part a reactive coupling, such as capacitive or inductive coupling through a dielectric material. Several configurations of reactive coupling connections are discussed below with regard to different embodiments of the RFID device 10. With regard to the direct (conductive) electrical connections between the conductive leads 20 and 22, and the arms 26 and 28, such connections may be made by use of a suitable conductive adhesive.

A circuit path 54 proceeds from one side (contact point) of the RFID chip 14, through the arm 26, the conductive connection 38, and the arm 28, to another side (contact point) of the RFID chip 14. Thus, in contrast to a standard slot antenna, there is not conductive material fully around the slot 30. A standard slot antenna has a short circuit of conductive material fully surrounding a slot.

The antenna structure 12 of the RFID device 10 may have some features of loop antennas, and may have some features of slot antennas, while overcoming the null spots that may occur in traditional loop antennas and slot antennas. The antenna structure 12 may provide better coverage of a wide range of orientations by coupling to the RFID chip 14 with at least two modes of operation. The antenna modes may include two or more modes that include modes such as a mode substantially that of a notch antenna, a mode substantially that of a loop antenna, a mode substantially that of a folded dipole antenna, and/or a mode substantially that of a slot antenna.

The RFID device 10 may utilize a variety of suitable materials. The substrate 42 may be a suitable plastic material, such as PET or polypropylene, which may be a flexible film or sheet of plastic material. The conductive layer 40 of the antenna structure 12 may be formed, deposited or adhered onto the substrate 42 by any of a variety of suitable methods. For example, the conductive layer 40 may be a conductive ink, such as an ink containing metal particles, that is printed onto the substrate 42 in a suitable pattern. Alternatively, the conductive layer 40 may be plated onto the substrate 42, such as by electroplating. As another alternative, the conductive layer 40 may be adhesively adhered to the substrate 42. Etching may be used to remove conductive material to form the slot 30.

The RFID device 10 may include additional suitable layers, such as protective layers to protect the functional elements of the device that may also provide desired surface properties such as printability or weatherability, and/or an adhesive layer to adhere the device 10 to an object.

It will be appreciated that a variety of wireless communication devices, such as RFID interposers or straps, may be used as the RFID interposer or strap 16. Examples of suitable RFID interposers or straps include an RFID strap available from Alien Technologies, and the interposer (called a module) marketed under the name I-CONNECT, available from Philips Electronics. Chips available from Alien Technologies may be attached either conductively, in a flip-chip die, or conductively or reactively for a strap form of the chip. Suitable RFID chips include Philips HSL chip, available from Philips Electronics, and the EM Marin EM4222, available from EM Microelectronic-Marin SA, as well as RFID chips available from Matrics Inc. of Columbia, Md. USA.

It will be appreciated that the RFID device 10 may have any of a variety of suitable configurations, some of which are described further below. The configuration of the conductive areas and slot of the antenna structure may vary widely, for instance. As one example, the slot 30 may be substantially rectangular, as shown in FIGS. 2 and 3. Alternatively, the slot may have another shape, such as bent or curved.

FIG. 4 shows one alternative configuration for the RFID device 10, in which the slot 30 has a bent shape, with a number of constant-width segments 60, 62, 64, and 68, angled with regard to one another. The segments 60-68 allow the same overall slot length on a small, more compact device. An RFID interposer 16 is mounted onto both sides of the aperture or slot 30, thus using material of the conductive layer on both sides of the slot 30 and along a distal end of the elongated slot as a hybrid loop-slot antenna, similar to the above-discussed embodiment of the RFID device 10 shown in FIGS. 2 and 3. The conductive layer 40 covers substantially all of an underlying substrate 42, with an exception of the slot 30.

Turning now to FIG. 5, another embodiment of the RFID device 10 is shown, in which the arms 26 and 28 are not directly electrically coupled to one another. Rather the arms 26 and 28 are reactively coupled together by respective coupling portions 76 and 78 of the arms 26 and 28, that are capacitively coupled together across an interaction region 80 of the substrate 42 upon which the conductive arms 26 and 28 are mounted. The interaction region 80 and the slot 30 are to some extent separate, although it will be appreciated that the interaction region 80 may be taken into account when properly tuning the antenna structure 12 by tuning the arms 26 and 28 in the vicinity of the slot 30.

The embodiment of the RFID device 10 illustrated in FIG. 5 may be advantageously used with RFID chips that require that no short circuit be presented between the contacts of the chip that are coupled to the arms 26 and 28. Examples of such RFID chips are the EM4222 and the HSL chips.

FIG. 6 illustrates yet another embodiment of the RFID device 10, which has an antenna structure 12 that includes both a hybrid loop-slot antenna, as well as a monopole antenna element 90. The hybrid loop-slot antenna may be similar to the structure described above with regard to the embodiment shown in FIGS. 2 and 3, with a pair of arms 26 and 28 coupled to different contact points of the RFID chip 14, and a conductive connection 38 between the arms 26 and 28, with the conductive connection 38 and the arms 26 and 28 defining the slot 30. The arms 26 and 28 are coupled, respectively, to an RF input 92 and a common (ground) connection 94 of the RFID chip 14.

The monopole antenna element 90 is a folded dipole element 96 that is electrically coupled to another contact point (connection) 100 of the RFID chip 14. The dipole element 96 has a serpentine shape, with a number of back-and-forth segments 102. The antenna structure 12 thus utilizes the hybrid loop-slot antenna as a ground plane for the folded dipole element 96. The antenna structure 12 is thus a dual polarization antenna.

FIG. 7-14 show various embodiments of the RFID device 10 that have capacitive coupling between the RFID chip 14 and at least one of the arms 26 and 28. Referring first to the embodiment of the RFID device 10 shown in FIGS. 7-9, the conductive leads 20 and 22 of the RFID interposer 16 are adhesively coupled to the arms 26 and 28 of the antenna structure 12 by respective adhesive pads or layers 110 and 112. The adhesive pads 110 and 112 are made from a non-conductive adhesive that prevents direct (conductive) electrical coupling between the conductive leads 20 and 22, and the arms 26 and 28. Rather, the conductive leads 20 and 22 are capacatively coupled to the arms 26 and 28 across the non-conductive adhesive pads 110 and 112. By avoiding direct conductive electrical coupling between the conductive leads 20 and 22, and the arms 26 and 28, shorting together of the corresponding contact points of the RFID chip 14 is avoided. As noted above, some chips may require that the contact points not be shorted together, for the chips to operate properly.

It will be appreciated that a suitable thickness may be selected for the adhesive pads 110 and 112, in order to provide the desired capacitive coupling between the conductive leads 20 and 22, and the arms 26 and 28. The thickness of the adhesive pads may be selected based on such factors as the operating power and frequency, the coupling area, and the dielectric constant of the adhesive to be used. In one example, adhesive pads having an area of 5 mm² and a thickness of 10 μm may be used, although it will be appreciated that a wide range of suitable areas and thicknesses may be used.

FIGS. 10A and 10B show another embodiment of the RFID device 10, which illustrates one way of forming a device that utilizes adhesive pads 110 and 112 to attach conductive leads 20 and 22 to arms 26 and 28. As shown in FIG. 10A, different parts of the device 10 are formed on different parts 120 and 122 of a substrate 124. The parts 120 and 122 have a fold line 126 therebetween. On the first part 120 the RFID interposer 16 is placed, with the conductive leads 20 and 22 face up. The RFID interposer 16 may be attached to the first part 120 of the substrate 124 by use of a suitable adhesive. Alternatively, the interposer 16 may be formed in situ, by depositing or forming the conductive leads 20 and 22, such as by printing or electroplating, after placing the RFID chip 14 face up on the first part 120.

The antenna structure 12 is deposited or attached onto the second part 122 of the substrate 124. The adhesive pads 110 and 112 may then be deposited on the arms 26 and 28 of the antenna structure 12, for example by a suitable printing process.

Following making of the structure shown in FIG. 10A, the two parts of the device are joined together by folding the substrate 124 along the fold line 126. This brings in conductive leads 20 and 22 into contact with the adhesive pads 110 and 112, thereby adhesively joining together the conductive leads 20 and 22 to the arms 26 and 28, as illustrated in FIG. 10B.

The first part 120 of the substrate 124 may be sized to substantially cover the second part 122, when the first part 120 is folded over the second part 122. The second part 122 may be pressed against and sealed to the second parts, such as by heat sealing, to enclose and protect the operative elements of the device 10.

It will be appreciated that the method of making an RFID device, as illustrated in FIGS. 10A and 10B, may be performed as a series of continuous roll operations, such as in a roll-to-roll process. The placement of the RFID chip 14 and/or the interposer 16; the formation of the antenna structure 12 on the substrate 124 (or adherence of the antenna structure 12 to the substrate 124); and/or placement of the adhesive pads 110 and 112, all may be performed as roll operations. Such operations may be performed on a web of material, which may then be suitably cut to produce individual RFID devices.

It will be further appreciated that the sort of method described above may be utilized with RFID devices having other configurations, as described herein. For example, suitable electrically-conductive adhesive may be substituted for non-conductive adhesive of the adhesive pads 110 and 112, thereby producing an RFID device 10 where the conductive leads 20 and 22 are directly (conductively) electrically coupled to the arms 26 and 28 of the antenna structure 12. As another example, the antenna structure 12 may have some of the other configurations described herein.

FIGS. 11A and 11B illustrate another folded embodiment of the device 10, with a first part 130 and a second part 132 of a substrate 134 being separated along a fold line 136. The first part 130 has an RFID chip 14 and conductive leads 20 and 22 thereupon. The second part 132 has the conductive layer 40, with its various parts 26, 28, and 38, thereupon.

As illustrated in FIG. 11B, the first part 130 may be folded back along the fold line 136, to make back-to-back contact with the second part 132 of the substrate 134. The parts 130 and 132 may be joined with an adhesive layer 138. In the resulting structure, the conductive leads 20 and 22 are capacitively coupled to the arms 26 and 28, with the combined thickness of the parts 130 and 132 in between.

Turning now to FIG. 12, another embodiment of the RFID device 10 has an interdigitated capacitive coupling 140 for coupling the RFID chip 14 (or an RFID interposer) to the arm 26 of the antenna structure 12. The chip 14 is conductively coupled to a conductive pad 142 on the substrate 42. The conductive pad 142 includes a number of fingers 144 jutting out therefrom, along the substrate 42. The fingers 144 interdigitate with corresponding fingers 146 of the arm 26, leaving a narrow serpentine gap 150 between the sets of fingers 144 and 146. Capacitive coupling may occur across the gap 150, indirectly (capacitively) electrically coupling the conductive pad 142 and the arm 26, without danger of short-circuiting of the arm 26. The conductive pad 142 and the fingers 144 may be part of a conductive layer 154 that also includes the arms 26 and 28, and the conductive connection 38.

Figure 13:
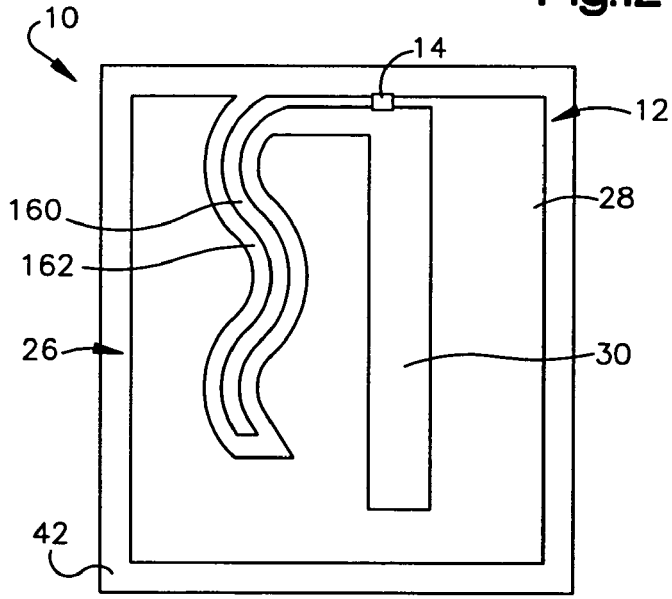
FIG. 13 is a plan view of still another alternate embodiment RFID device in accordance with the present invention.

FIG. 13 shows an additional embodiment of an RFID device 10 that has reactive coupling between the chip 14 and the arm 26. In the embodiment shown in FIG. 13, the RFID chip 14 (or RFID interposer) is coupled to a conductive element 160 that follows a curvy path through the arm 26, with a gap 162 between the conductive element 160 and the arm 26. This enables capacitive coupling between the conductive element 160 and the arm 26.

Figure 14:
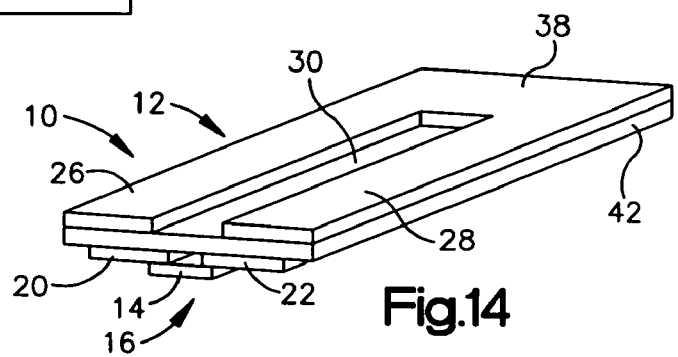
FIG. 14 is a plan view of another alternate embodiment RFID device in accordance with the present invention.

FIG. 14 illustrates yet another capacitive coupling embodiment of the RFID device 10. The device shown in FIG. 14 has the antenna structure 12 on an opposite side of the substrate 42 from the RFID interposer 16. The conductive leads 20 and 22 of the RFID interposer 16 are capacitively coupled with the arms 26 and 28 of the antenna structure 12, across the portions of the substrate 42 therebetween.

A variety of capacitive coupling embodiments of the RFID device 10 have been described above. It will be appreciated that other types of indirect reactive coupling, such as inductive coupling via a magnetic field, may be used instead.

Figure 15:
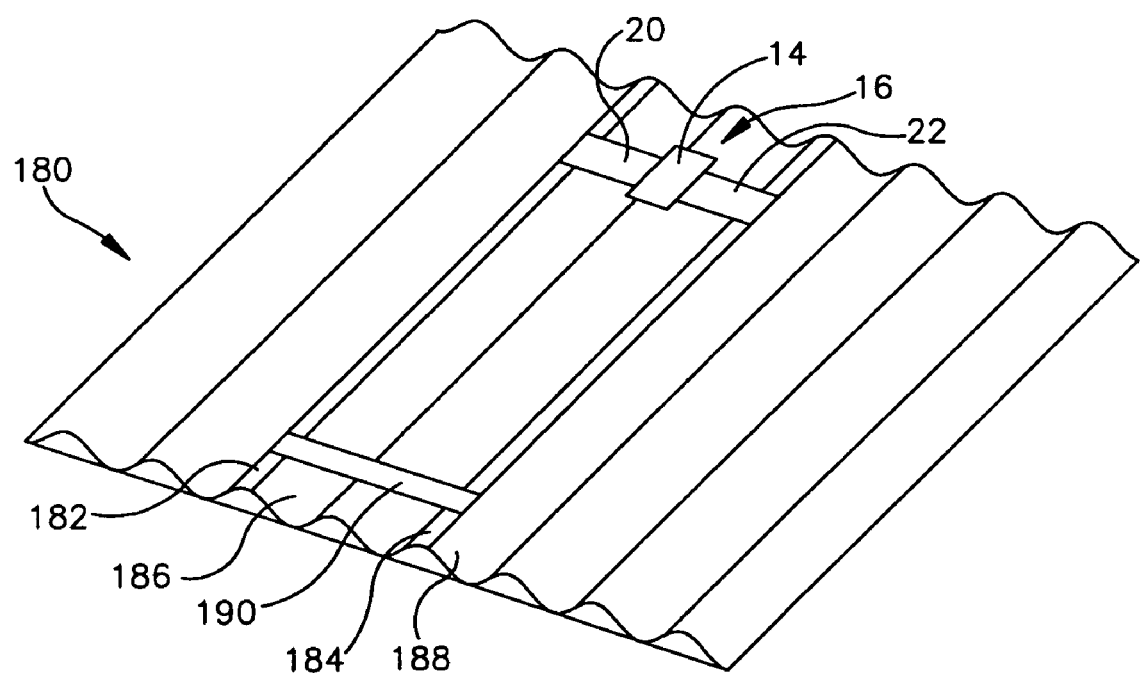
FIG. 15 is an oblique illustrating yet another alternate embodiment RFID device in accordance with the present invention.

FIG. 15 illustrates an embodiment of the RFID device 10 with a corrugated cardboard layer 180. A pair of conducting strips 182 and 184, such as copper strips, are placed on corrugations 186 and 188 during manufacture of the cardboard layer 180. The conducting strips 182 and 184 serve as the arms of a hybrid loop/aperture antenna. A shorting conductive connection 190 is placed at one point along the conductive strips 182 and 184, and an RFID interposer 16 is placed at another point along the conductive strips 182 and 184. The points for placement for the shorting connection 190 and the interposer 16 are chosen so that the aperture 12 defined by the various elements has a suitable length.

Following placement of the elements of the device 10 shown in FIG. 15, construction of the cardboard layer may be completed by placement of a facing layer atop the corrugations. The cardboard may be used for suitable purposes, such as in a carton or other container. The RFID device 10 thus may be employed as an internal device within a cardboard layer, readable from a wide variety of orientations. The placement of the device within the cardboard layer may help protect the device from physical damage during handling of the cardboard. In addition, placement of the device within a cardboard layer helps to hide the device, protecting it from deliberate attempts to disable it. However, it will be appreciated that an external marker may be provided on the cardboard to indicate location of the RFID device 10, for example to aid in placement of a reader for short-range reading.

Figure 16:
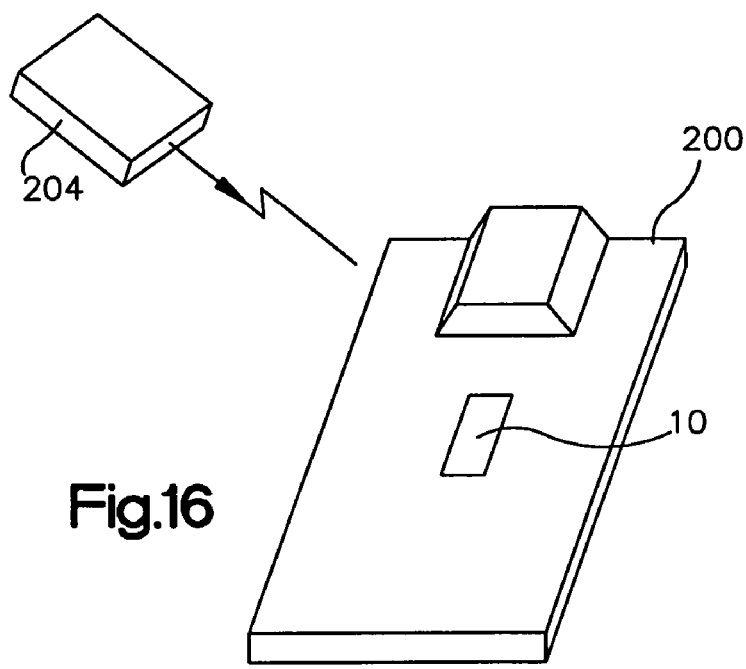
FIG. 16 is an oblique view illustrating one application for an RFID device of the present invention, attachment to a clothing item.

FIG. 16 illustrates one application of the RFID device 10, with application of the device 10 to a clothing item 200, such as a shirt. The device 10 may be a card-mounted label placed between buttons of the clothing item 200, or attached to the item 200 with a plastic fastener. The device 10 on the clothing item 200 may be read with a hand-held reader 204, from any of a variety of directions relative to the clothing item 200.

Figure 17:
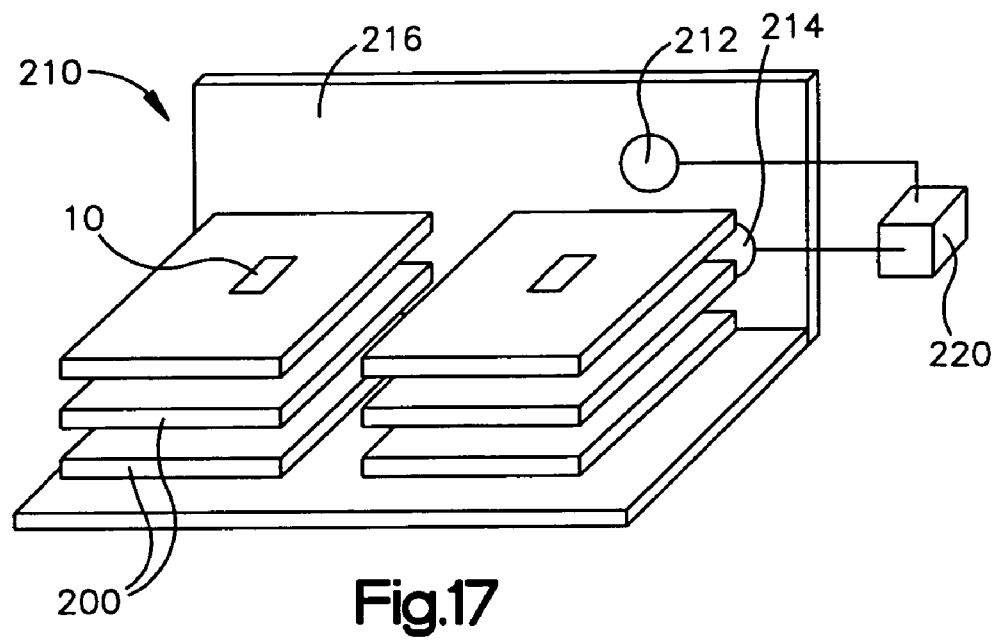
FIG. 17 is an oblique view of a reader display unit able to read RFID devices of the present invention.

FIG. 17 shows a display unit 210 capable of reading RFID devices 10 on a group of clothing items 200. The display unit 210 has a number of suitable antennas 212 and 214 in a back wall 216 of the display unit 210. The antennas 212 and 214 are coupled to a reader 220. The ability of the RFID devices 10 to be read along their edges in a variety of orientations, especially along axes in the narrow directions of the devices 10, facilitates reading of the devices by the display unit 210.

Figure 18:
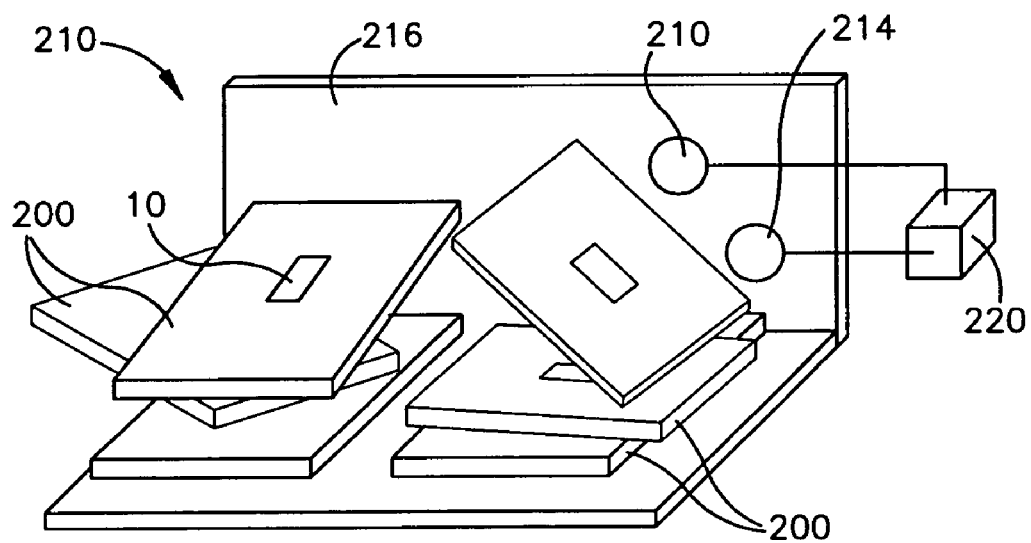
FIG. 18 is an oblique view of another reader display unit able to read RFID devices of the present invention.

It will be appreciated that the variety of permissible edge-reading angles for the devices 10 allow reading even when the items 200 are placed in the display unit 210 at a variety of orientations, as illustrated in FIG. 18. The flexibility in variety of read orientation for the RFID devices 10 allows, for example, a retailer flexibility to display the items 200 at a variety of orientations, while still allowing them to be detected by the display unit 210. In addition, detection by the display unit 210 may be maintained largely unaffected by how the items 200 are placed or misplaced in the display unit, such as by employees or customers.

Figure 19:
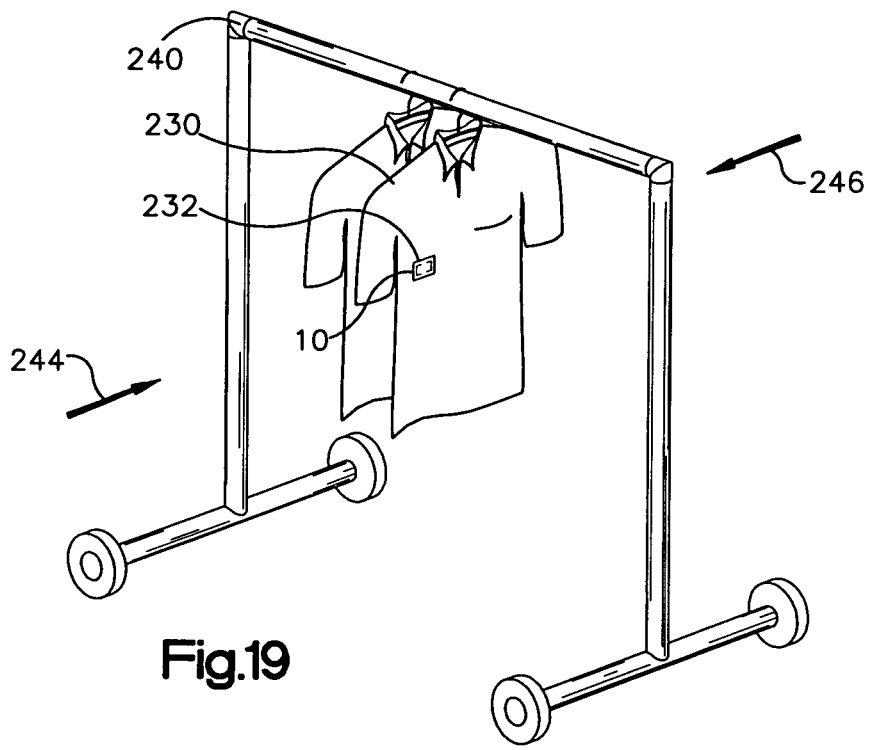
FIG. 19 is an oblique view illustrating reading of clothing items on a portable rack.

FIG. 19 illustrates reading of RFID devices 10 on clothing items 230, which are on a portable rack 240. The RFID devices 10 may be integrated into labels 232 on the clothing items 230. The devices 10 on the items 230 may be read from a side direction 244 or 246 as the rack 240 is moved past a reading station. The good edge-reading characteristics of the RFID devices 10 facilitate detection of the devices 10 in the directions 244 and 246.

Figure 20:
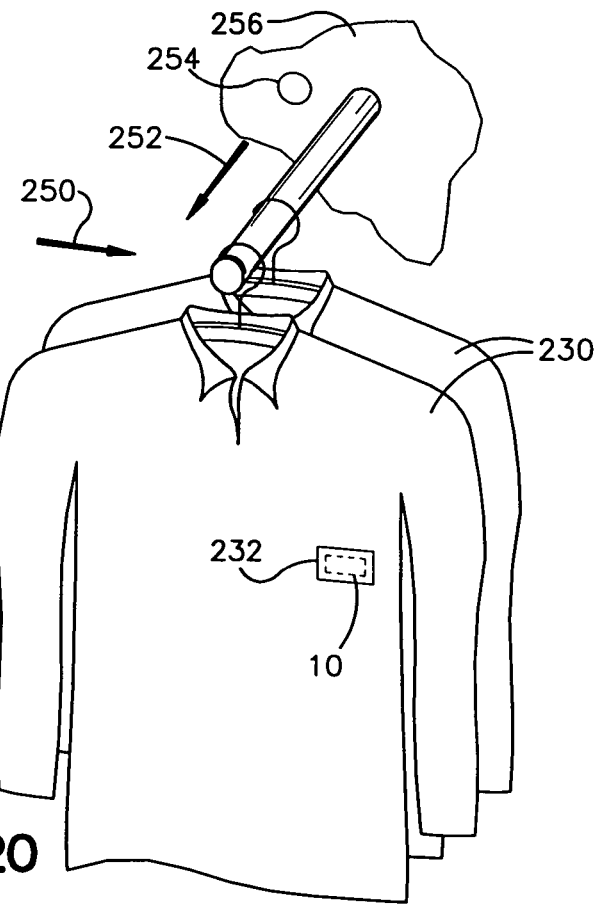
FIG. 20 is an oblique view illustrating reading of clothing items on a display rack.

FIG. 20 shows the clothing items 230 mounted on a display rack 250. The RFID devices 10 on the clothing items 230 may be read from a read direction 252, from an antenna 254 on a back wall 256 of the display rack 250. FIGS. 19 and 20 illustrate the usefulness of the quasi-isotropic read properties of the RFID device 10, allowing the clothing items 230 to be detected on a variety of racks, read from a variety of directions.

It will be appreciated that the read properties of the RFID devices 10 may be utilized in detecting and/or tracking a wide variety of objects in addition to clothing items. The detection of the clothing items 200 and 230 is but one example of a wide variety of objects with which the RFID devices 10 may be utilized.

Figure 21A:
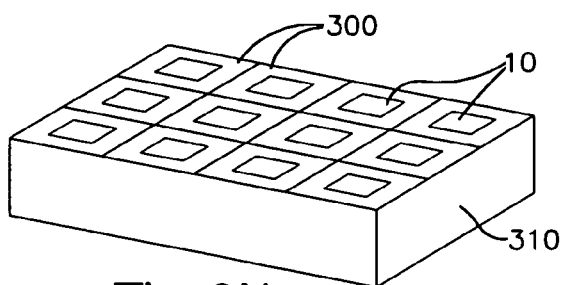
FIG. 21A is an oblique view of multiple objects, each with an RFID device, in close proximity, in a carton or container.
Figure 21B:
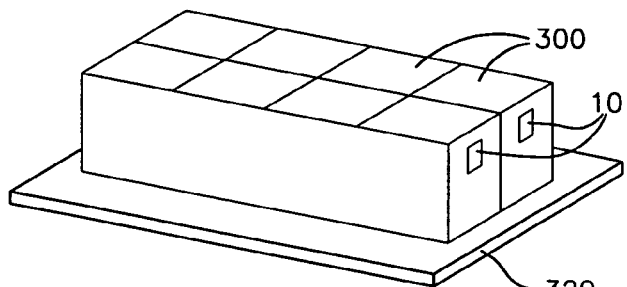
FIG. 21B is an oblique view of multiple objects, each with an RFID device, in close proximity, on a shelf.

Turning now to FIGS. 21A and 21B, multiple objects 300, each with an RFID device 10, are placed in close proximity to one another, such that the proximity of the RFID devices 10 to one another enhances performance of the RFID devices 10. FIG. 21A shows the objects 300 placed in a carton or container 310. FIG. 21 B shows the objects 300 placed on a shelf 320.

The term "close proximity," as used herein, refers to adjacent (nearest) of the RFID devices 10 being within about twice a relevant longest dimension of conductive material (e.g., length or width) of the antenna of the RFID device 10. A group of RFID devices 10 may be said to be in close proximity to one another if each of the RFID devices is in close proximity with at least one other device, and if all of the RFID devices are linked together by devices in close proximity with one another. For instance, if the antennas of the RFID devices 10 had a length and width of about 5 cm, the RFID device 10 may be in close proximity to one another if they are within about 10 cm of one another.

It is believed that having the RFID devices 10 in close proximity to one another improves the radiation resistance of the RFID devices 10. This improves the performance of the RFID devices 10, such as by increasing the read distance and/or signal strength for the RFID devices 10.

It will be appreciated that many advantages may be obtained by increasing performance of the RFID devices 10 when the devices 10 are in close proximity to one another. The increased performance of devices in close proximity to one another may allow use of smaller RFID devices, while still maintaining desired performance levels, at least when the devices are in close proximity to one another. Smaller RFID devices 10 are desirable from a number of standpoints: smaller RFID devices require less raw materials, which may reduce costs; and smaller RFID devices require less space to affix to an object, are less obtrusive, and are less likely to be damaged. In addition, smaller RFID devices may be less detectable after purchase by the end user, when the RFID device 10 is no longer in close proximity to other such devices. The reduced detectability of a separated RFID device (not in close proximity to other devices) may allay privacy concerns concerning RFID devices.

Increased performance of the RFID devices 10 may be particularly useful in circumstances where the RFID devices 10 are naturally grouped together, such as when objects are shipped in containers or are displayed on shelf or in other ways. For instance, the shelf 320 may have or be near a reader 324 used to keep track of available inventory.

The performance of the RFID devices 10 may also be enhanced by the presence of electrically-conductive materials, other than those in the RFID device 10. For instance, the objects 300, the container 310, and/or the shelf 320 may contain the metal or other electrically-conductive material that may enhance the performance of the RFID devices 10.

The RFID devices 10 may have an overall size of about 8 cm (3 inches)×8 cm (3 inches) or less. The RFID device 10 may be even smaller, having for example a size of about 4 cm×4 cm or less, or of about 2.5 cm (1 inch)×2.5 cm (1 inch) or less. However, it will be appreciated that other sizes for the RFID devices 10 are possible.

From the definition of "close proximity" given above, it will be appreciated that there is a wide range of spacing of RFID devices 10 that will produce enhanced performance of the RFID devices 10. For example, the RFID devices 10 may have enhanced performance when the nearest devices are within about 4 cm of each other.

Generally, the enhancement of performance resulting by the close proximity of the RFID devices 10 is increased the closer the devices 10 are to one another. This result is not to be expected from experiences with at least some types of prior art antenna configurations, such as dipole antenna configurations. In contrast to the enhancement by close proximity described herein, performance of devices with dipole antennas actually degrades when the devices are brought closely together, with nearby devices effectively "de-tuning" one another.

FIGS. 21A and 21B show the objects 300 in the container 310 and on the shelf 320. It will be appreciated that objects with RFID devices may be placed in close proximity to one another in many other sorts of circumstances, including other sorts of display devices and/or transport devices and/or configurations.

Generally it is observed in the case of RFID devices with hybrid antennas (combining characteristics of slot or notch antennas with characteristics of loop antennas) that the enhancement of performance is most pronounced if the tags are in close proximity, and are coplanar.

Figure 22A:
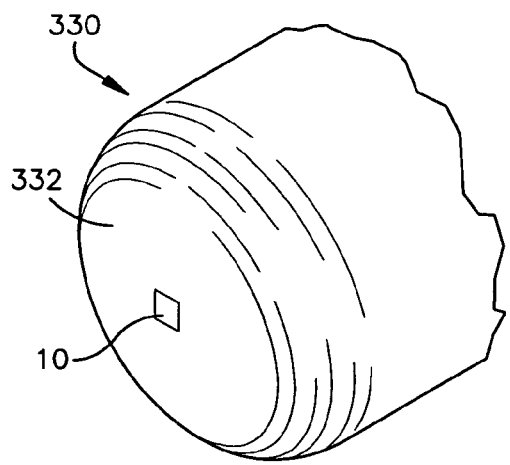
FIG. 22A is an oblique view of a bottle with an RFID device on its bottom surface.
Figure 22B:
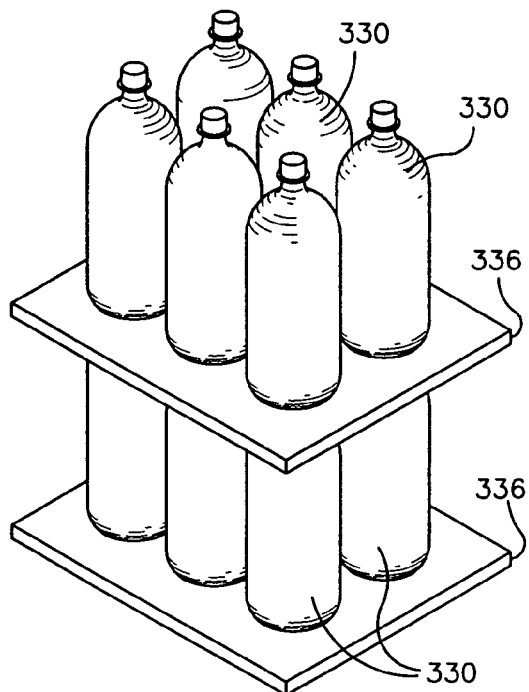
FIG. 22B is an oblique view layers of bottles with RFID devices.
Figure 22C:
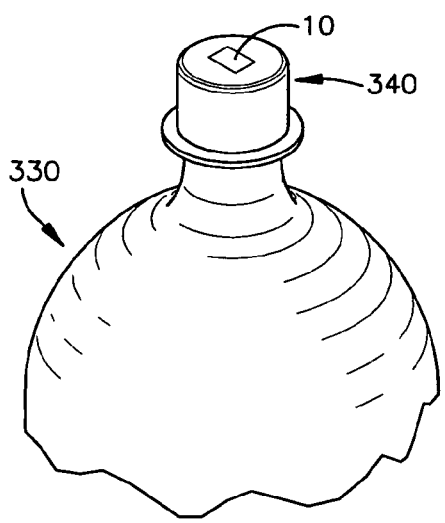
FIG. 22C is an oblique view of a part of a bottle with an RFID device on its cap.
Figure 22D:
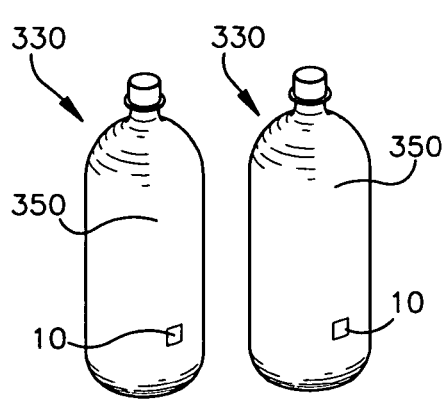
FIG. 22D is an oblique view of cylindrical bottles with RFID devices thereupon.
Figure 22E:
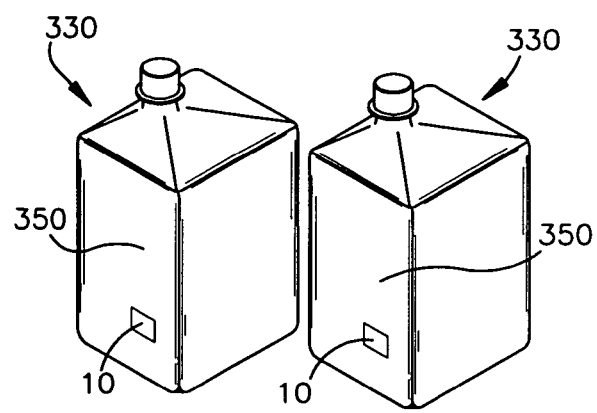
FIG. 22E is an oblique view of rectangular bottles with RFID devices thereupon.

This performance enhancement in grouping of tagged items may be employed to advantage in the RFID tagging of packaged articles. FIGS. 22A-22E illustrate this effect in a variety of configurations of RFID-tagged, packed bottles 330, with RFID devices 10 in close proximity to one another. In FIG. 22A the bottles 330 are tagged at their the bottom surfaces 332 with RFID devices 10, wherein packing the bottles 330 on a common surface results in roughly coplanar placement of the RFID devices 10. FIG. 22B shows multiple layers of tagged bottles 330 separated by packing sheets 336, resulting in a series of co-planar groups of RFID devices (horizontal planes at different packing levels). In FIG. 22C, the RFID devices 10 are applied to plastic bottle caps 340 instead of to the bottoms of the bottles. Placement of the RFID devices 10 on the bottle caps 340 may be desirable for bottles containing liquids, in order to provide greater distance of the RFID device 10 from the liquid. In FIGS. 22D and 22E the bottles 330 are tagged at their sidewalls 350. For bottles 330 with cylindrical shapes 352 (FIG. 22D), this may result in less consistency in co-planarity of groups of tags because of variations in orientation from bottle to bottle. For bottles 300 with flat faces 354 and natural orientations, such as rectangular cross sections 358 (FIG. 22E), it is easier to assure co-planarity of the RFID devices 10.

FIGS. 22A-22E show RFID devices 10 placed on bottles 330. However, it will be appreciated that the bottles 300 are merely examples of a larger group of objects that may have RFID devices 10 attached to or mounted thereupon.

Figure 23:
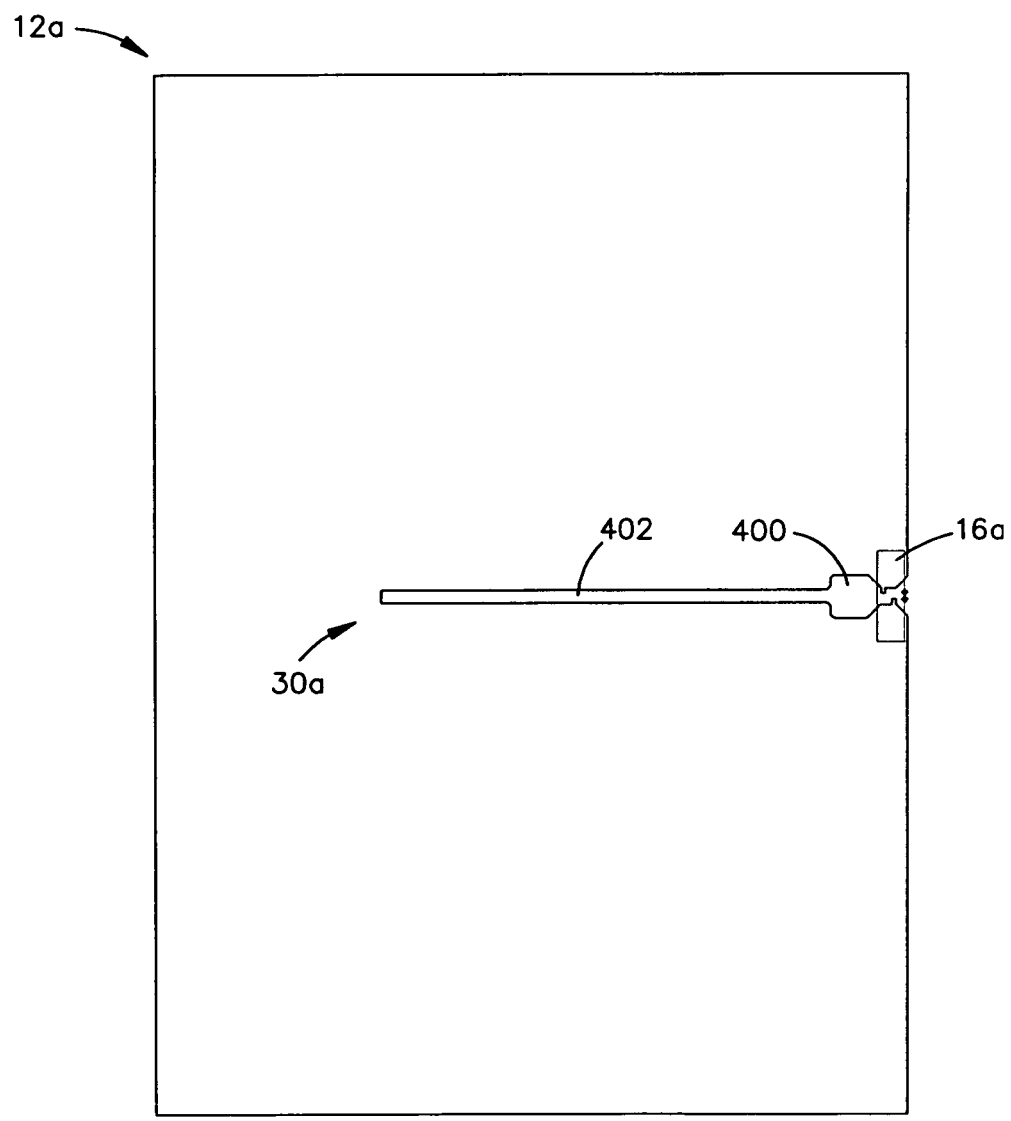
FIG. 23 is a plan view of an RFID device with an antenna structure of a first configuration.

FIGS. 23-32 show several possible alternative configurations for the antenna structure 12 of the RFID device 10. FIG. 23 shows an antenna structure 12a having a rectangular shape, with a straight slot 30a having a wider portion 400 close to an RFID interposer 16a, and a narrower portion 402 further from the interposer 16a.

Figure 24:
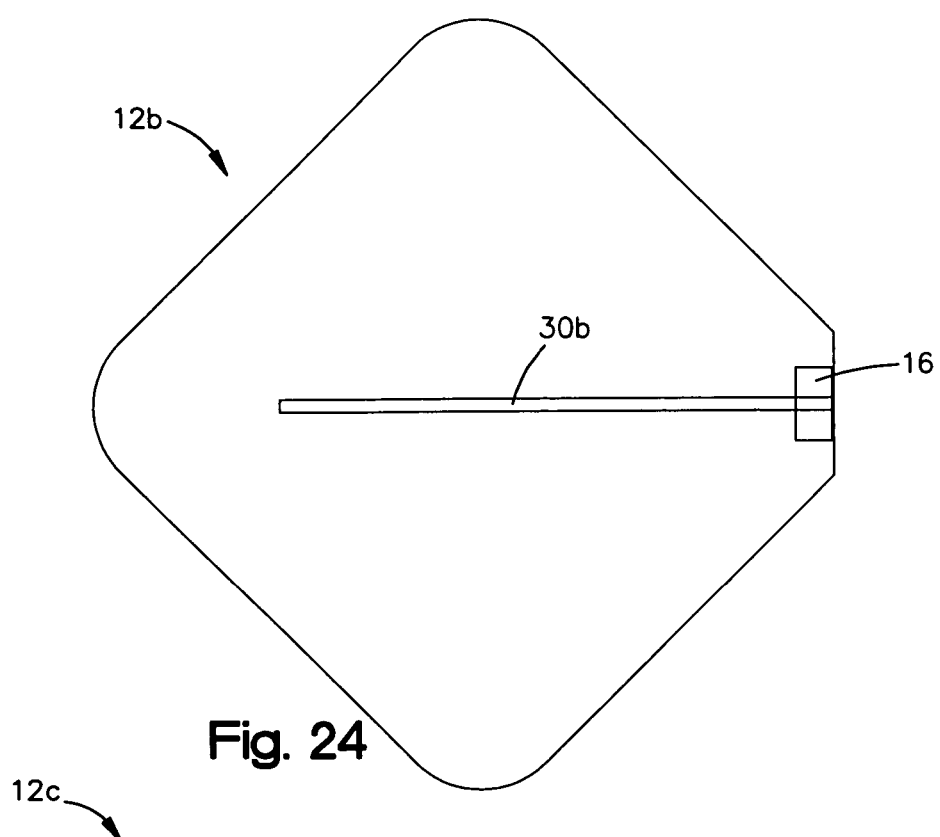
FIG. 24 is a plan view of an RFID device with an antenna structure of a second configuration.
Figure 25:
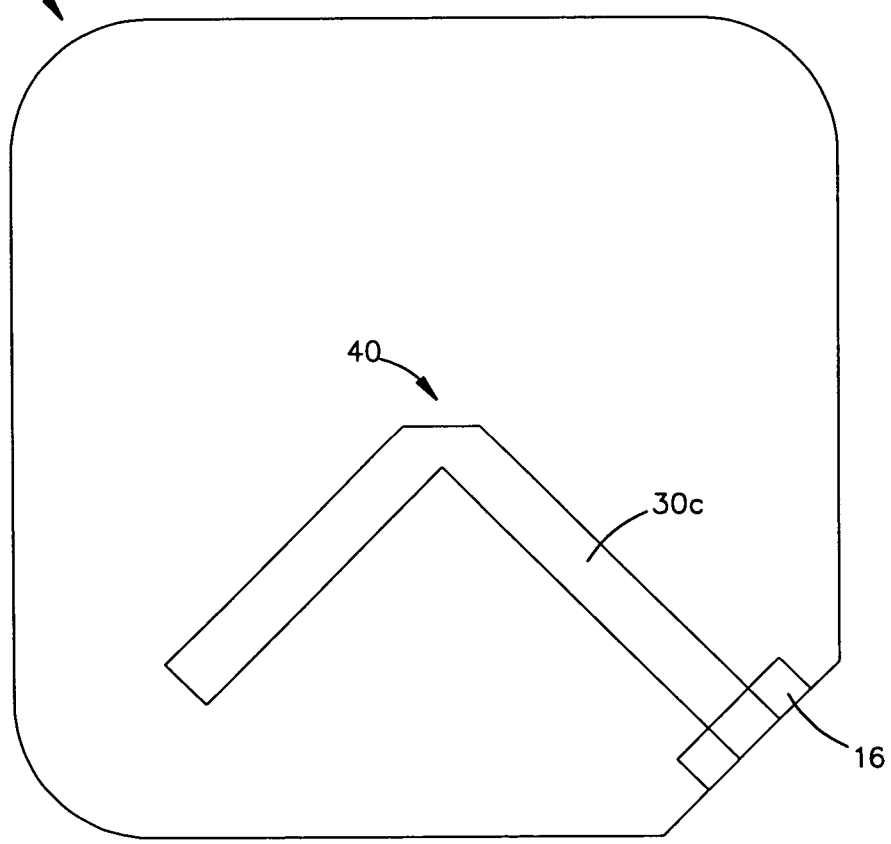
FIG. 25 is a plan view of an RFID device with an antenna structure of a third configuration.
Figure 26:
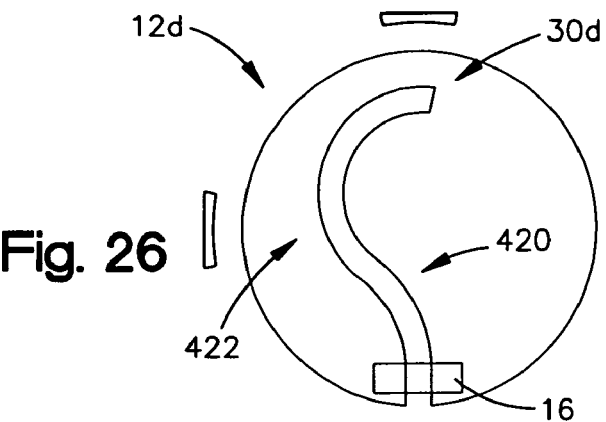
FIG. 26 is a plan view of an RFID device with an antenna structure of a fourth configuration.
Figure 27:
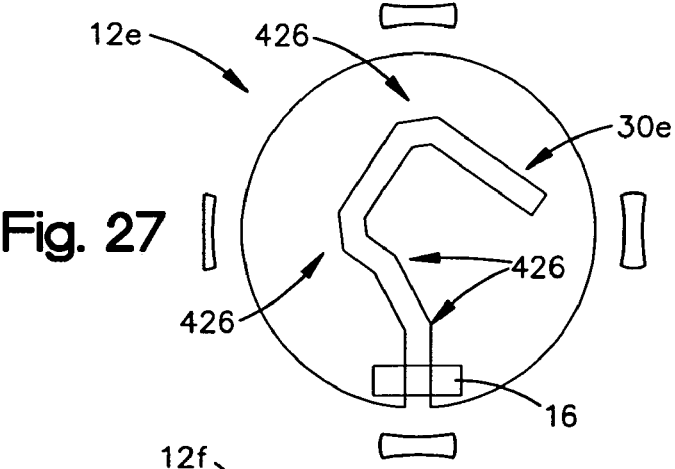
FIG. 27 is a plan view of an RFID device with an antenna structure of a fifth configuration.
Figure 28:
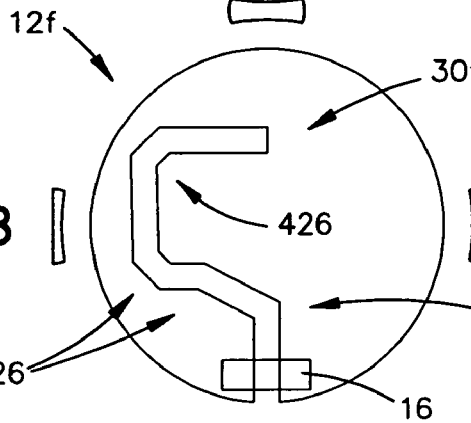
FIG. 28 is a plan view of an RFID device with an antenna structure of a sixth configuration.
Figure 29:
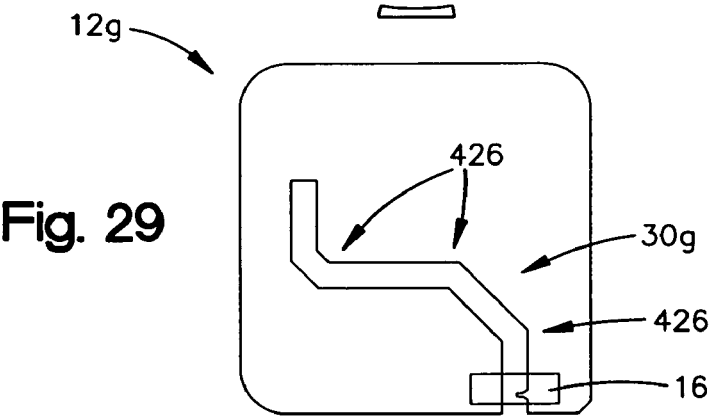
FIG. 29 is a plan view of an RFID device with an antenna structure of a seventh configuration.

FIGS. 24 and 25 show antenna structures 12b and 12c that both have square shapes, with respective diagonal slots 30b and 30c. The slot 30b is a straight slot, running from one corner of the antenna structure 12b, through the center of the structure, and most of the way to the opposite corner. The slot 12c is an angled slot, with a bend 410 at a center of the antenna structure 12c.

FIGS. 26-29 show various antenna structures 12d-12g with non-straight slots 30d-30g. The slot 30d has a pair of curved sections 420 and 422. The slots 30e-30g have various angled bends 426 in them. The antenna structures 12d-12f have a generally circular shape, while the antenna structure 12g has a square shape.

Figure 30:
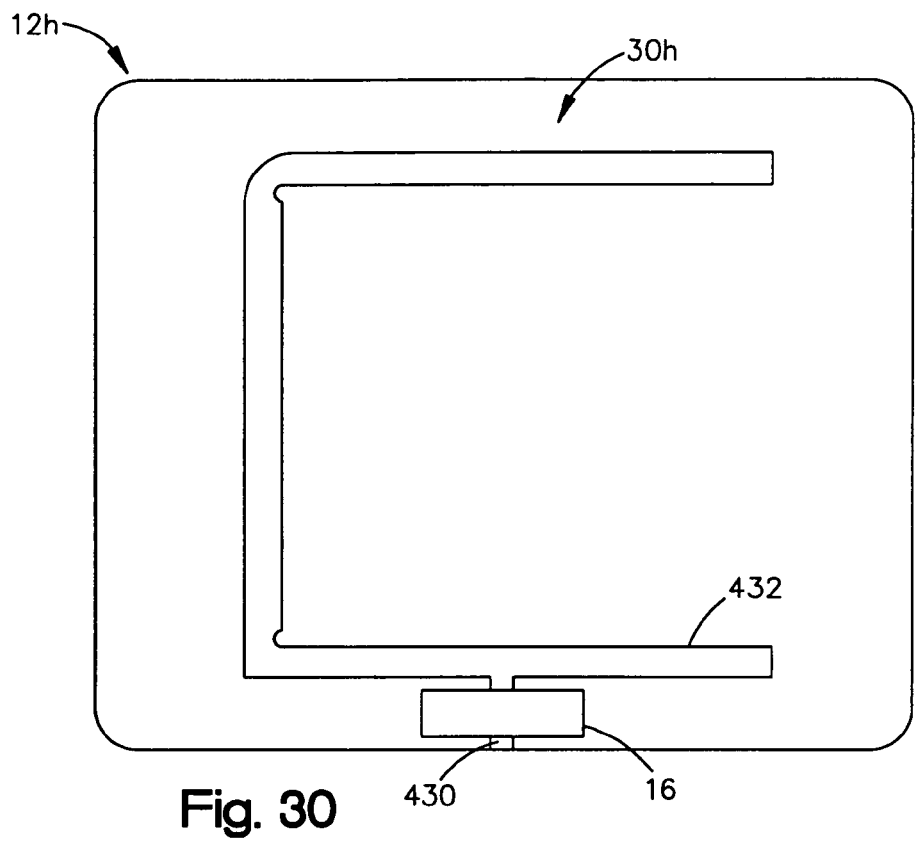
FIG. 30 is a plan view of an RFID device with an antenna structure of an eighth configuration.

FIG. 30 shows an antenna structure 12h with a square shape, and having a C-shape slot 30h. The slot 30h has a branch 430 is coupled to one of the distal legs 432 of the C-shape slot 30h. The RFID interposer 16 is coupled across the branch 432.

Figure 31:
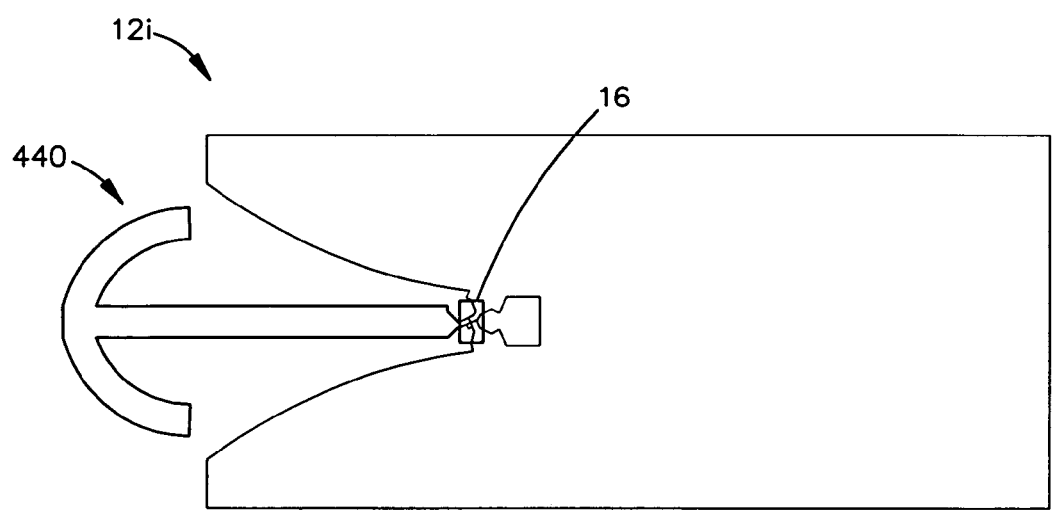
FIG. 31 is a plan view of an RFID device with an antenna structure of a ninth configuration.

FIG. 31 shows an antenna structure 12i that has a compensation element 440 that aids in compensating for electrical characteristics of nearby objects (e.g., electrical conductive and dielectric constant), so as to provide performance that is less dependent upon the characteristics of nearby objects. Many other sorts of compensation elements are described and illustrated in U.S. Provisional Patent Application No. 60/536,483, filed Jan. 20, 2004, which is incorporated herein by reference in its entirety.

Figure 32:
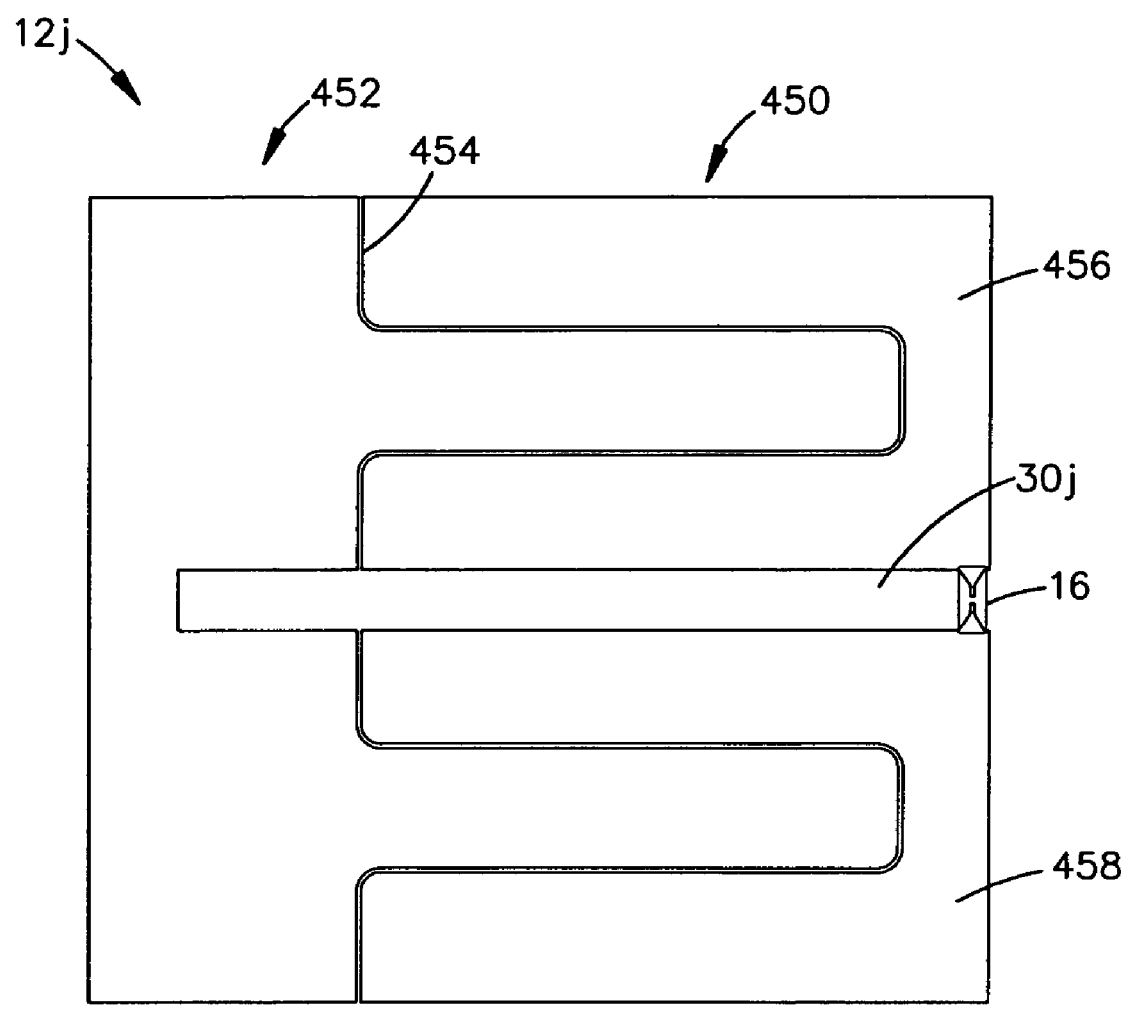
FIG. 32 is a plan view of an RFID device with an antenna structure of a tenth configuration.

FIG. 32 shows an antenna structure 12j that includes a pair of portions 450 and 452 that are separated by a narrow gap 454. The portions 450 and 452 may be capacitively coupled across the gap 454. A straight slot 30j fully separates parts 456 and 458 of the portion 450, and partially bisects the portion 452.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An RFID device comprising:
   an antenna structure having a sheet of electrically conductive material extending on both sides of an elongated slot; and
   a wireless communication device having a pair of contact points electrically coupled to respective parts of the conductive material;
   wherein the parts of conductive material are electrically coupled together at a first end of the elongated slot distal from the wireless communication device;
   wherein a second end of the elongated slot is an open end, not short-circuited between the parts;
   wherein the elongated slot has a slot length in a direction in which the slot is elongated, and a slot width in a direction perpendicular to the slot length; and
   wherein the parts of conductive material extending on the sides of the slot along the slot length have a combined antenna width in the direction of the slot width that is greater than the slot width of the slot.

2. The device of claim 1, wherein the antenna structure is on a dielectric substrate material.

3. The device of claim 1, wherein the parts of the conductive material include arms of conductive material.

4. The device of claim 1, wherein the parts are capacitively coupled together at the first end of the slot.

5. The device of claim 1, wherein the parts are directly electrically connected by a conductive connection.

6. The device of claim 1, wherein the parts and the contact points are directly electrically coupled together by electrically conductive elements.

7. The device of claim 1, wherein one of the parts is capacitively coupled to its corresponding contact point.

8. The device of claim 1, wherein the elongated slot has a substantially rectangular shape.

9. The device of claim 1, wherein the elongated slot has a pair of borders substantially parallel to one another.

10. The device of claim 1, wherein the antenna structure also includes a monopole antenna element coupled to an additional contact of the wireless communication device.

11. The device of claim 1, wherein the first end of the elongated slot is short-circuited between the parts.

12. The device of claim 1,
wherein the wireless communication device is an RFID chip that is part of an RFID interposer; and
wherein the RFID interposer includes a pair of conductive leads electrically coupled to the parts of the electrically conductive material.

13. The device of claim 1, wherein the wireless communication device and the antenna structure form an antenna with at least two modes of operation.

14. The device of claim 13, wherein the at least two modes of operation includes two or more modes of operation selected from the group consisting of a mode substantially that of a notch antenna, a mode substantially that of a loop antenna, a mode substantially that of a folded dipole antenna, and a mode substantially that of a slot antenna.

15. The device of claim 1, wherein the wireless communication device and the antenna structure form an antenna having substantially isotropic read characteristics.

16. The device of claim 1, in combination with a plurality of other RFID devices, wherein the RFID devices are in close proximity to one another.

17. The combination of claim 16, wherein performance of the RFID devices is enhanced by their close proximity to one another.

18. The combination of claim 17, wherein the RFID devices each have an overall size of 8 cm×8 cm or less.

19. The combination of claim 18, wherein the RFID devices each have an overall size of 4 cm×4 cm or less.

20. The combination of claim 16, further in combination with a container, wherein the devices are in the container.

21. The combination of claim 20,
wherein the container is a carton or box; and
wherein the devices are mounted to respective objects in the carton or box.

22. The combination of claim 16, further in combination with a display, wherein the devices are in the display.

23. The combination of claim 16, further in combination with plural bottles, wherein the devices are coupled to respective of the bottles.

24. The combination of claim 23, wherein the devices are on caps of the bottles.

25. The combination of claim 23, wherein the devices are on bottom surfaces of the bottles.

26. The combination of claim 23, wherein the devices are on sidewalls of the bottles.

27. The combination of claim 16, wherein the devices are in a substantially planar array.

28. The device of claim 1, wherein the slot is elongated in a direction from the first end to the second end.

29. The device of claim 1, wherein the slot width is substantially constant along the slot length of the elongated slot.

30. An RFID device comprising:
a continuous layer of conductive material with an elongated slot therein, wherein the elongated slot has an open end, with no conductive connection across the open end; and
an RFID interposer with respective different contact points electrically coupled to the conductive material on respective opposite sides of the elongated slot;
wherein the elongated slot has a slot length in a direction in which the slot is elongated, and a slot width in a direction perpendicular to the slot length; and
wherein parts of conductive material extending on the sides of the slot along the slot length have a combined antenna width in the direction of the slot width that is greater than the slot width of the slot.

31. A method of communicating with one or more of plural RFID devices, the method comprising:
enhancing performance of the devices by bringing the RFID devices in close proximity to one another, wherein the enhancing performance includes increasing at least one of read distance for the devices or signal strength for the devices; and
communicating with wireless communication devices of the one or more of the RFID devices;
wherein each of the RFID devices includes:
an antenna structure having electrically conductive material on both sides of an elongated slot; and
one of the wireless communication devices, the wireless communication device having a pair of contacts electrically coupled to respective parts of the conductive material; and
wherein the parts of conductive material are electrically coupled together at an end of the elongated slot distal from the wireless communication device.

32. The method of claim 31, wherein each of the devices has an overall size of 8 cm×8 cm or less.

33. The method of claim 31, wherein the enhancing performance includes placing the devices in a container.

34. The method of claim 31, wherein the enhancing performance includes placing the devices in a carton.

35. The method of claim 31, wherein the enhancing performance includes placing the devices in a display.

36. The method of claim 31, wherein the enhancing performance includes placing the devices on a shelf.

37. The method of claim 31, wherein the enhancing performance includes placing at least some of the devices in the vicinity of electrically conductive material.

38. The method of claim 31, wherein the enhancing performance includes placing at least some of the devices in a substantially planar array.

39. The method of claim 31, wherein, for each of the RFID devices:
the end of the elongated slot distal from the wireless communication device is a first end;
a second end of the elongated slot is an open end, not short-circuited between the parts;
the elongated slot has a slot length in a direction in which the slot is elongated, and a slot width in a direction perpendicular to the slot length; and
the parts of conductive material extending on the sides of the slot along the slot length have a combined antenna width in the direction of the slot width that is greater than the slot width of the slot.

40. The method of claim 39, wherein, for each of the RFID devices, the slot is elongated in a direction from the first end to the second end.

41. The method of claim 39, wherein, for each of the RFID devices:
the wireless communication device and the antenna structure form an antenna with at least two modes of operation; and
the at least two modes of operation includes two or more modes of operation selected from the group consisting of a mode substantially that of a notch antenna, a mode substantially that of a loop antenna, a mode substantially that of a folded dipole antenna, and a mode substantially that of a slot antenna.

42. The method of claim 40, wherein the enhancing performance includes making the devices substantially coplanar with one another.

43. An RFID device comprising:
an antenna structure having a sheet of electrically conductive material extending on both sides of an elongated slot; and
a wireless communication device having a pair of contact points electrically coupled to respective parts of the conductive material;
wherein the parts of conductive material are electrically coupled together at a first end of the elongated slot distal from the wireless communication device;
wherein a second end of the elongated slot is an open end, not short-circuited between the parts; and
wherein the parts are capacitively coupled together at the first end of the slot.

44. The device of claim 43,
wherein the wireless communication device and the antenna structure form an antenna with at least two modes of operation; and
wherein the at least two modes of operation includes two or more modes of operation selected from the group consisting of a mode substantially that of a notch antenna, a mode substantially that of a loop antenna, a mode substantially that of a folded dipole antenna, and a mode substantially that of a slot antenna.

* * * * *